US008659642B2

(12) United States Patent
Shin et al.

(10) Patent No.: US 8,659,642 B2
(45) Date of Patent: Feb. 25, 2014

(54) STEREOSCOPIC VIDEO FILE FORMAT AND COMPUTER READABLE RECORDING MEDIUM IN WHICH STEREOSCOPIC VIDEO FILE IS RECORDED ACCORDING THERETO

(75) Inventors: Hwa Seon Shin, Seongnam-si (KR); Jin Su Myung, Yongin-si (KR); Je Woo Kim, Seongnam-si (KR); Byeong Ho Choi, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 470 days.

(21) Appl. No.: 12/864,404

(22) PCT Filed: Jan. 28, 2009

(86) PCT No.: PCT/KR2009/000408
§ 371 (c)(1),
(2), (4) Date: Jul. 23, 2010

(87) PCT Pub. No.: WO2009/093881
PCT Pub. Date: Jul. 30, 2009

(65) Prior Publication Data
US 2010/0289876 A1    Nov. 18, 2010

(30) Foreign Application Priority Data
Jan. 25, 2008    (KR) .......................... 10-2008-0008118

(51) Int. Cl.
*H04N 13/00*    (2006.01)
(52) U.S. Cl.
USPC ............................................................ 348/43
(58) Field of Classification Search
USPC ............................................................ 348/43
See application file for complete search history.

(56) References Cited

U.S. PATENT DOCUMENTS 5,576,950 A * 11/1996 Tonomura et al. ............ 386/200
5,642,171 A *  6/1997 Baumgartner et al. ....... 348/515

(Continued)

FOREIGN PATENT DOCUMENTS

| EP | 1 501 317 A1 | 1/2005 |
| JP | 2006-013759 A | 1/2006 |
| KR | 10-2005-0092688 A | 9/2005 |
| KR | 10-2006-0100347 A | 9/2006 |
| KR | 10-0716142 B1 | 5/2007 |

OTHER PUBLICATIONS

ISO, ISO/IEC 14496-12, Oct. 1, 2005, ISO, 2nd Edition, pp. 94.*

(Continued)

*Primary Examiner* — Sath V Perungavoor
*Assistant Examiner* — Peter D Le
(74) *Attorney, Agent, or Firm* — Sughrue Mion, PLLC

(57) ABSTRACT

The present invention relates to a stereoscopic video file format capable of improving bit efficiency and processing efficiency and a computer-readable recording medium in which the corresponding stereoscopic video file are recorded. The present invention includes: a file type box that stores file format information and information indicating whether or not to include monoscopic data; a movie box that stores a plurality of trak boxes configuring stereoscopic video streams; a media data box that stores multimedia resources; a stereoscopic video media information box that stores at least one common stereoscopic video stream arrangement information; a stereoscopic camera and display information reference box that stores camera parameter and recommendation display information referenced by the plurality of trak boxes; a stereoscopic camera and display information box that exists at each stereoscopic image frame of the stereoscopic video stream and stores reference information of the stereoscopic camera and display information reference box; and a meta box that stores metadata, thereby making it possible to minimize overlapping data and optimizing a configuration of a file format in a simple form.

21 Claims, 2 Drawing Sheets

(56) References Cited

U.S. PATENT DOCUMENTS

| | | | |
|---|---|---|---|
| 6,005,607 A * | 12/1999 | Uomori et al. | 348/42 |
| 6,175,379 B1 * | 1/2001 | Uomori et al. | 348/47 |
| 6,268,880 B1 * | 7/2001 | Uomori et al. | 348/47 |
| 2003/0156188 A1 * | 8/2003 | Abrams, Jr. | 348/51 |
| 2006/0051057 A1 * | 3/2006 | Nakagawa | 386/69 |
| 2007/0014219 A1 * | 1/2007 | Hirabayashi et al. | 369/53.2 |
| 2007/0078898 A1 * | 4/2007 | Hayashi et al. | 707/104.1 |
| 2008/0303813 A1 * | 12/2008 | Joung et al. | 345/419 |
| 2008/0303832 A1 * | 12/2008 | Kim et al. | 345/501 |
| 2008/0303893 A1 * | 12/2008 | Kim et al. | 348/42 |
| 2009/0066783 A1 * | 3/2009 | Lee et al. | 348/43 |
| 2009/0148070 A1 * | 6/2009 | Hwang et al. | 382/305 |
| 2009/0199100 A1 * | 8/2009 | Hwang et al. | 715/723 |
| 2009/0208119 A1 * | 8/2009 | Lee et al. | 382/232 |

OTHER PUBLICATIONS

ISO, ISO/IEC 14496-1, Oct. 1, 2001, ISO, 2nd Edition, pp. 684.*
Yoon et al., "International Organization for Standardization: Coding of Moving Pictures and Audio," ISO/IEC WD 23000-11, 2008, pp. 1-12.

* cited by examiner

FIG. 1

| LEFT ES | S₁ | S₂ | M₁ | S₃ | S₄ | S₅ | M₂ | S₆ | ⋯ | scdi scdi     scdi scdi scdi     scdi ⋯

| RIGHT ES | S₁ | S₂ | S₃ | S₄ | S₅ | S₆ | S₇ | ⋯⋯ | scdi scdi scdi scdi scdi scdi scdi ⋯

STEREOSCOPIC VIDEO FILE FORMAT AND COMPUTER READABLE RECORDING MEDIUM IN WHICH STEREOSCOPIC VIDEO FILE IS RECORDED ACCORDING THERETO

TECHNICAL FIELD

The present invention relates to a stereoscopic video, and more particularly, to a stereoscopic video file format capable of improving bit efficiency and processing efficiency and a computer-readable recording medium in which the corresponding stereoscopic video file are recorded.

BACKGROUND ART

With the development of an image technology and a digital technology, a stereoscopic video technology that further increases animation of images and enables persons watching the images to increase the feel of actual sensation has been developing.

In particular, 'JTC 1/SC 29/WG11' that is an image related standardization group organized by ISO/IEC has proposed a file format of a stereoscopic video for storing and reproducing stereoscopic video and has discussed a method of effectively optimizing the file format.

The known stereoscopic video file format relates to an image of binocular disparity, which includes a variety of information such as information showing an arrangement form of a left image and a right image, information informing whether or not to include a mono image such as intermediate insertion advertisement, recommendation display information, and camera parameter information, information on whether or not to refer to other images and information indicating what image is referred to.

However, the known stereoscopic video file format generally includes recommendation display information and camera parameter information on each image, such that the data amount is increased because it does not exclude the overlapping portions, which degrade efficiency. In particular, when a video stream called an element stream (ES) has 2ES, in which the left image and the right image are each encoded, almost all or all of the corresponding information of the left image and the right image overlap.

FIG. 1 is a structural diagram showing stereoscopic video stream structure of 2ES according to the related art.

As shown in FIG. 1, the stereoscopic video stream of 2ES is configured to include left ES, right ES, two ESs. Each ES may include a plurality of stereoscopic image frames $S_1$ to $S_n$ and intermediate inserted mono image frames $M_1$ to $M_n$.

Each stereoscopic video stream is stored in a place called a trak box together with the stereoscopic camera and display information (SCDI) that shows the camera parameter and recommendation display information. At this case, the stereoscopic camera and display information almost all or completely overlaps between the left ES and the right ES. Since it is impossible to refer to the inter-trak box, the structure according to the related art cannot essentially exclude the above-mentioned overlapping.

In addition, when one image within one ES refers to other images, too many images refer to one image or when the reference relation is entangled, the complexity of the file format increases.

In this case, in order to see what image refers to what image during a process of analyzing the file by the computer, the reference information on all the images should be analyzed, such that it is impossible to configure an initial map.

DISCLOSURE

Technical Problem

The present invention has been made in an effort to provide a stereoscopic video file format capable of minimizing overlapping data and a computer-readable recording medium in which the corresponding stereoscopic video file are recorded.

Further, the present invention has been made in an effort to provide a stereoscopic video file format capable of optimizing a configuration of a file format in a simple format and a computer-readable recording medium in which the corresponding stereoscopic video file are recorded.

In addition, the present invention has been made in an effort to provide a stereoscopic video file format capable of facilitating a file format design of a specific image by enabling initial map configuration and a computer-readable recording medium in which the corresponding stereoscopic video file are recorded.

Technical Solution

An exemplary embodiment of the present invention provides stereoscopic video file format, including: a file type box that stores file format information and information indicating whether or not to include monoscopic data; a movie box that stores a plurality of trak boxes configuring stereoscopic video streams; a media data box that stores multimedia resources; a stereoscopic video media information box that stores at least one common stereoscopic video stream arrangement information; a stereoscopic camera and display information reference box that stores camera parameter and recommendation display information referenced by the plurality of trak boxes; a stereoscopic camera and display information box that exists at each stereoscopic image frame of the stereoscopic video stream and stores reference information of the stereoscopic camera and display information reference box; and a meta box that stores metadata.

The stereoscopic video file format further includes a stereoscopic video media information extension box that designates redefinition of the stereoscopic video stream arrangement information for expansion through the redefinition.

Another exemplary embodiment of the present invention provides a stereoscopic video file format, including: a first area that stores a plurality of stereoscopic image frames configuring stereoscopic video streams; a second area that stores common stream arrangement information on the plurality of stereoscopic image frames; a third area that stores camera parameter and recommendation display information to be referenced by at least one stereoscopic image frame; and a fourth area that exists at each of the stereoscopic image frames and stores the reference information of the third area.

Yet another exemplary embodiment of the present invention provides a stereoscopic video file format, including: a trak box that stores stereoscopic video streams; a stereoscopic video media information (semi) box that stores arrangement information on the stereoscopic video stream; a stereoscopic camera and display information (scdi) box that stores stereoscopic camera and recommendation display information, wherein the trak box refers to at least one of the svmi box and the scdi box.

The trak box may include a reference box that stores identification information on the svmi box and the scdi box for referring to at least one of the svmi box and the scdi box.

Still yet another exemplary embodiment of the present invention provides a computer readable recording medium recording a stereoscopic video file, including: a file type box that stores file format information and information indicating whether or not to include monoscopic data; a movie box that stores a plurality of trak boxes configuring stereoscopic video streams; a media data box that stores multimedia resources; a stereoscopic video media information box that stores at least one common stereoscopic video stream arrangement information; a stereoscopic camera and display information reference box that stores camera parameter and recommendation display information referenced by the plurality of trak boxes; a stereoscopic camera and display information box that exists at each stereoscopic image frame of the stereoscopic video stream and stores reference information of the stereoscopic camera and display information reference box; and a meta box that stores metadata.

Advantageous Effects

According to the exemplary embodiments of the present invention, a stereoscopic video file format and a computer-readable recording medium in which the corresponding stereoscopic video file are recorded collect and store the overlapping information existing at each stereoscopic image frame in one area and refers to the corresponding information through a link at the time of performing the decoding, such that the overlapping information is removed from the stereoscopic video file, thereby making it possible to improve the bit efficiency and the processing efficiency.

Further, the present invention simplifies the sophisticated structure of the stereoscopic video file and provides the optimized stereoscopic video file format, thereby making it possible to contribute to standardizing the art.

DESCRIPTION OF DRAWINGS

FIG. 1 is a structural diagram of a stereoscopic video stream structure in a 2ES mode according to the related art.

BEST MODE

Figure 2:
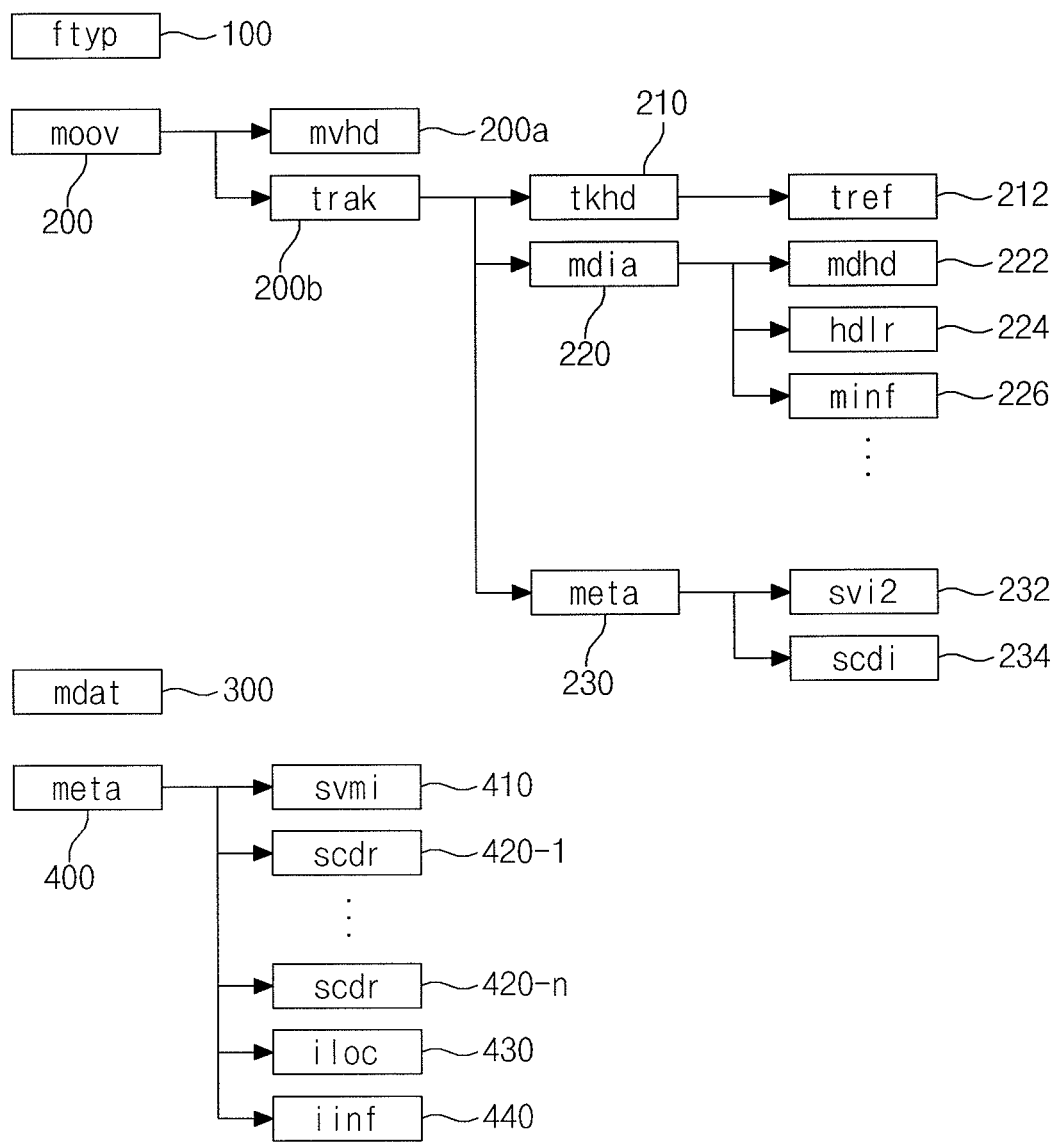
FIG. 2 is a structural diagram showing a structure of a stereoscopic video file format according to an exemplary embodiment of the present invention.

Exemplary embodiments of the present invention will now be described in detail with reference to the accompanying drawings. It is to be noted that like components are denoted by like reference numerals throughout the drawings. Moreover, detailed descriptions related to well-known functions or configurations will be ruled out in order not to unnecessarily obscure the subject matter of the present invention.

FIG. 2 is a structural diagram showing a structure of a stereoscopic video file format according to an exemplary embodiment of the present invention.

As shown in FIG. 2, the stereoscopic video file format according to an exemplary embodiment of the present invention may be configured to include a file type (ftyp) box 100 that stores file format information and information indicating whether or not to include monoscopic data; a movie (moov) box 200 that stores a plurality of trak boxes 200*b* configuring stereoscopic video streams; a media data (mdat) box 300 that stores multimedia resources; and a first meta box 400 that is configured of meta data.

The stereoscopic video stream may be configured of at least one element streams (ES).

The file type box 100 may be configured in the following [Table 1].

TABLE 1

| Types | Specifications |
|---|---|
| ss01 | Stereoscopic content without partial monoscopic data |
| ss01 | Stereoscopic content with partial monoscopic data |

In other words, the file type box 100 shows the file type and may include an identifier such as "ss01" and "ss02" in order to indicate whether the monoscopic data are included in the stereoscopic contents. The monoscopic data may be data of advertisement images.

The movie box 200 may further include a movie header (mvhd) box 200*a* that is header information on images.

The movie box 200 may further include at least one mono data that are inserted into the trak boxes.

The trak box 200*b* may include a trak header (trhd) box 210 that stores the overall information on the corresponding trak box 200*b* and a media (mdia) box 220 that is a container storing media information in the trak box 200*b*. The trak header box 210 may include a trak reference (tref) box 212 that is a trak reference container. The media box 220 may include a media header (mdhd) box 222 that stores the overall information on media; a handler (hdlr) box 224 that shows a media type such as audio data or video data; and a media information (minf) box 226 that is a media information container.

The stereoscopic video file format according to the exemplary embodiment of the present invention may further include: a stereoscopic video media information (semi) box 410 that stores at least one stereoscopic video stream arrangement information; and at least one stereoscopic camera and display information reference (scdr) boxes 420-1 to 420-*n* that store camera parameter and recommendation display information referred to by the plurality of trak boxes 200*b*.

The svmi box 410 and the scdr boxes 420-1 to 420-*n* may be included in the first meta box 400. The first meta box 400 may further include an item location (iloc) box 430 that stores item locations and an item information (iinf) box 440 that stores the item information.

The stereoscopic video file format according to an exemplary embodiment of the present invention may further include a stereoscopic video media information extension (svi2) box 232 that designates redefinition of the stereoscopic video stream arrangement information that facilitates expansion through the redefinition; and a stereoscopic camera and display information box (scdi box) that may link one of the scdr boxes 420-1 to 420-*n* or designate the redefinition of the camera parameter and recommendation display information.

The svi2 box 232 and scdr box 234 may be included in the second meta box 230 that is stored in the trak box 200*b*.

The figure shows that the svmi box 410 and the scdr boxes 420-1 to 420-*n* are included in the first meta box 400, the svi2 box 232 and the scdr box 234 are included in the second meta box 230 stored in the trak box 200*b*, but the svmi box 410, the scdr boxes 420-1 to 420-*n*, the svi2 box 232, and the scdr box 234 may not be necessarily included in the specific meta box and therefore, may be flexibly moved according to situations. For example, the svmi box 410 and the scdr 420-1 to 420-*n* boxes may be included in the movie box 200 and the svmi box 410, the scdr boxes 420-1 to 420-*n*, the svi2 box 232, and the scdr box 234 may independently exist at the outside rather than being included in any box.

Alternatively, when a significant amount of information is included in the boxes and thus, the processing time is delayed, the information included in the boxes may be separated into a separate box form by a predetermined unit or reference. For example, a portion related to the camera parameter information of the scdr box or the scdi box and a portion related to the recommendation display information may be separated into a separate box form. Alternatively, the svmi box storing the arrangement information of the stereoscopic video stream or the scdi box storing the stereo camera and recommendation display information exists at the outside of the trak box, such that the trak box can refer to the scdr box or the scdi box at the outside. In this case, the svmi box or the scdi box may be included in other trak box. For example, the svmi box or the scdi box may exist at the outside for the left image and in the trak box for the right image.

The svmi box 410 may be configured in a format such as the syntax of the following [Table 2]. The bit size allocated to each field is by way of example only and therefore, is not limited thereto. It can be apparent to those skilled in the art that the bit size can be variously changed if necessary.

TABLE 2

<Syntax of svmi box>

```
aligned(8) class StereoscopicVideoMediaInformationBox extends
    FullBox('svmi', version = 0, 0){
    // stereoscopic visual type information
    unsigned int(8)         stereoscopic_composition_type;
    if (stereoscopic_composition_type != 3)
    {
        unsigned int(1)     is_left_first;
        unsigned int(7)     reserved;
    }
    else
        unsigned int(8)     reserved;
    // stereoscopic contents information
    unsigned int(32) stereo_mono_change_count;
    for(i=0; i<stereo_mono_change_count; i++){
        unsigned int(32)    sample_count;
        unsigned int(1)     stereo_flag;
        unsigned int(7)     reserved;
    }
}
```

Reviewing the above [Table 2], the svmi box 410 may include common information on each content.

A field value of "stereoscopic_composition_type" showing the element (ES) stream structure of the stereoscopic video file format may be defined by the following [Table 3].

TABLE 3

| Stereoscopic_composition_type | Idenification | |
|---|---|---|
| 0 | 1 Only ES exists | Side-by-Side format |
| 1 | 1 Only ES exists | Vertical Line integrated format |
| 2 | 1 Only ES exists | Frame sequential format |
| 3 | 2 ES exists | Monoscopic image |

When the value of "stereoscopic_composition_type" is 0, 1, and 2, "is_left_first" indicating whether the left image frame is first and "stereo_mono_change" that is identification information on the stereoscopic image frame and the mono image frame may be commonly used.

Meanwhile, when the value of "stereoscopic_composition_type" is 3, "is_left_first" cannot be commonly used, such that the information on the svi2 box 232 of the corresponding trak may be used. In addition, the "stereo_mono_change" may be commonly used or may not be commonly used. If it is determined that the "stereo_mono_change" is not commonly used, the information on the svi2 box 232 of the corresponding trak may be used.

In other words, in the 1ES, all the trak boxes 200*b* refers to the information on the semi box 410 and in the case of the 2ES, each trak box 200*b* may use the information on the svi2 box 232 that is stored in the trak boxes 200*b*.

The svi2 box 232 may be configured in a format such as the syntax of the following [Table 4].

TABLE 4

<Syntax of svi2 box>

```
aligned(8) class StereoscopicVideoMediaInformationBoxEx extends
    FullBox('svi2', version = 0, 0){
    // stereoscopic visual type information
    unsigned int(1)     is_left_first;
    unsigned int(1)     is_update_flag;
    unsigned int(6)     reserved;
    if(is_update_flag){
        // stereoscopic fragment information
        unsigned int(32)        stereo_mono_change_count;
        for(i=0; i<stereo_mono_change_count; i++){
            unsigned int(32)    sample_count;
            unsigned int(1)     stereo_flag;
            unsigned int(7)     reserved;
        }
    }
}
```

Referring to the above [Table 4], the svi2 box 232 stores only the information according to the characteristics of each trak based on the information on the semi box 410 declared on the uppermost. This information may be updated if necessary. For example, if the information on "is_update_flag" that is a field indicating whether the "stereo_mono_count" is updated, the "stereo_mono_count" information of the corresponding trak is written. Further, in the case of 2ES, the value of "is_left_first" may be designated as [Table 5].

TABLE 5

| is_left_first | Identification |
|---|---|
| 1 | Monoscopic left image |
| 0 | Monoscopic right image |

The scdr boxes 420-1 to 420-*n* may be configured in a format such as the syntax of the following [Table 6].

TABLE 6

<Syntax of scdr box>

```
aligned(8) class StereoscopicCameraAndDisplayInformationBox extends
    FullBox('scdr', version = 0, 0){
    unsigned int (16) scdr_ID;
    // stereoscopic display information
    unsigned int(16)    expected_display_width;
    unsigned int(16)    expected_display_height;
    unsigned int(16)    expected_viewing_distance;
    int(16)             min_of_disparity;
    int(16)             max_of_disparity;
    // stereoscopic camera information
    unsigned int(32)    baseline;
    unsigned int(32)    focal_length;
    unsigned int(32)    convergence_distance;
    unsigned int(1)     is_camera_cross;
    unsigned int(7)     reserved;
```

TABLE 6-continued

<Syntax of scdr box>

```
    if (is_camera_cross){
        unsigned int (32)        rotation;
    }
}
```

The scdr boxes 420-1 to 420-n may be generated by the number of combinations of displays and cameras used in the video sequence. Therefore, the scdr boxes 420-1 to 420-n are a reference of the scdi box 234 to be used in the entire file and may include the corresponding identification information scdr_ID.

The scdi box 234 may be configured in a format such as the syntax of the following [Table 7].

TABLE 7

<Syntax of scdi box>

```
aligned(8) class StereoscopicCameraAndDisplayInformationBox extends
    FullBox('scdi', version = 0, 0){
    unsigned int (16) item_count;
    for( i=0; i<item_count; i++ ){
        unsigned int(16)     item_ID;
        unsigned int(1)      is_item_ID_ref;
        unsigned int(1)      is_scdr_ID_ref;
        unsigned int (6)     reserved;
        if(is_scdi_ID_ref)
        {
            unsigned int(16)     ref_scdr_ID;
        }
        else{
            if(is_item_ID_ref){
                unsigned int(16)     ref_item_ID;
            }
            else{
                //stereoscopic display information
                unsigned int(1)      is_display_safety_info;
                unsigned int(7)      reserved;
                if(is_display_safety_info){
                    unsigned int(16)     expected_display_width;
                    unsigned int(16)     expected_display_height;
                    unsigned int(16)     expected_viewing_distance;
                    int(16)              min_of_disparity;
                    int(16)              max_of_disparity;
                }
                // stereoscopic camera information
                unsigned int(1)      is_cam_params;
                unsigned int(7)      reserved;
                if(is_cam_params){
                    unsigned int(32)     baseline;
                    unsigned int(32)     focal_length;
                    unsigned int(32)     convergence_distance;
                    unsigned int(1)      is_camera_cross;
                    unsigned int(7)      reserved;
                    if(is_camera_cross){
                        unsigned int (32)        rotation;
                    }
                }
            }
        }
    }
}
```

In the above [Table 7], "is_scdr_ID_ref" indicates whether or not to use the display and camera information of the scdr boxes 420-1 to 420-n and "ref_scdr_ID" indicates the ID of the scdr boxes 420-1 to 420-n that are referenced. For example, if "is_scdr_ID_ref" is 1, the scdi box 234 uses the display and camera information of one 420-i of the scdr boxes 420-1 to 420-n and thus, can search the scdr box 420-i having the identification information on "ref_scdr_ID" and use the information.

In other words, the svi2 box 232 and the scdi box 234 existing in each stereoscopic image frame may link the semi box 410 and the scdr boxes 420-1 to 420-n of each of the meta box levels and redefine the information therein.

Through this, the overlapping information of the trak box level is collected in the meta box level and is linked or redefined in the trak box level, thereby making it possible to minimize the overlapping data.

As described above, the stereoscopic video file according to the stereoscopic video file format according to the present invention may be stored in a recording medium (for example, CD-ROM, RAM, floppy disk, hard disk, a magneto-optical disk, flash memory, etc.) in a computer-readable type.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

INDUSTRIAL APPLICATION

The present invention relates to a stereoscopic video file format capable of improving bit efficiency and processing efficiency and a computer-readable recording medium in which the corresponding stereoscopic video file are recorded, which can be used in an image technology industry or a digital technology industry.

The invention claimed is:

1. A method of constituting a stereoscopic video file, the method comprising:
   providing a file type box that stores file format information and information indicating whether to include monoscopic data in stereoscopic data;
   providing a movie box that stores a plurality of trak boxes configuring stereoscopic video streams;
   providing a media data (mdat) box that stores multimedia resources;
   providing a stereoscopic video media information (svmi) box that stores common arrangement information about at least one of the stereoscopic video streams;
   providing at least one stereoscopic camera and display information reference (scdr) box that stores information about a camera parameter and a recommended display referred to by the plurality of trak boxes;
   providing a stereoscopic camera and display information (scdi) box, in each stereoscopic image frame of at least one of the stereoscopic video streams, that stores reference information about the scdr box so that the scdi box refers to the information about the camera parameter and the recommended display stored in the scdr box by using the reference information; and
   providing a meta box that stores metadata about the stereoscopic video streams,
   wherein the scdr box is included not in the trak boxes and the movie box but in the meta box, and the scdi box is included in the trak boxes.

2. The method of claim 1, further comprising:
   providing a stereoscopic video media information extension (svi2) box that stores redefined arrangement information about the at least one of the stereoscopic video streams.

3. The method of claim 2, wherein the svi2 box is included in the trak boxes.

4. The method of claim 2, wherein the trak boxes refer to one of the arrangement information in the svmi box and the redefined arrangement information in the svi2 box.

5. The method of claim 1, wherein the scdi box is included in the trak boxes.

6. The method of claim 1, wherein the svmi box and scdr box are included in the meta box.

7. The method of claim 1, wherein the trak boxes refer to the information about the camera parameter and the recommended display in the scdi box.

8. The method of claim 7, further comprising:
   storing the scdr box and the svmi box in the meta box;
   storing the scdi box in the trak boxes; and
   linking the scdi box to the scdr box.

9. The method claim of 8, wherein the scdi box stores identification information about the scdr box to be linked.

10. The method of claim 8, wherein the scdi box stores information about a redefined camera parameter and recommended display information in the scdr box.

11. The method of claim 1, wherein the scdr box is generated by a number of a combination of displays and cameras used in generating the stereoscopic video streams.

12. A method of generating a stereoscopic video file, the method comprising:
    providing a first area that stores a plurality of stereoscopic image frames configuring stereoscopic video streams;
    providing a second area that stores common arrangement information about the stereoscopic video streams;
    providing a third area that stores information about a camera parameter and recommend display to be referred to by at least one stereoscopic image frame; and
    providing a fourth area, in each of the stereoscopic image frames, that stores the reference information about the third area so that the fourth area refers to the information about the camera parameter and recommended display stored in the third area by using the reference information.

13. The method of claim 12, further comprising:
    providing a fifth area that stores redefined arrangement information about the stereoscopic video streams.

14. The method of claim 12, wherein the stereoscopic image frame refers to the information about the camera parameter and the recommended display in the third area.

15. The method of claim 14, wherein the fourth area is linked to the third area and refers to the information about the camera parameter and the recommended display in the third area.

16. The method of claim 15, wherein the fourth area stores identification information about the third area for linking.

17. The method of claim 15, wherein the fourth area stores a redefined camera parameter and recommend display information in the third area.

18. A non-transitory computer readable recording medium recording a method of generating a stereoscopic video file, the method comprising:
    providing a file type box that stores file format information and information indicating whether to include monoscopic data in stereoscopic data;
    providing a movie box that stores a plurality of trak boxes configuring stereoscopic video streams;
    providing a media data (mdat) box that stores multimedia resources;
    providing a stereoscopic video media information (svmi) box that stores common arrangement information about at least one of the stereoscopic video streams;
    providing at least one stereoscopic camera and display information reference (scdr) box that stores information about a camera parameter and a recommended display referred to by the plurality of trak boxes;
    providing a stereoscopic camera and display information (scdi) box, in each stereoscopic image frame of at least one of the stereoscopic video streams, that stores reference information about the scdr box so that the scdi box refers to the information about the camera parameter and the recommended display stored in the scdr box by using the reference information; and
    providing a meta box that stores metadata about the stereoscopic video streams,
    wherein the scdr box is included not in the trak boxes and the movie box but in the meta box, and the scdi box is included in the trak boxes.

19. The non-transitory computer readable recording medium of claim 18, further comprising a stereoscopic video media information extension (svi2) box that stores redefined arrangement information about at least one of the stereoscopic video streams.

20. A method of constituting a stereoscopic video file, the method comprising:
    providing a trak box that stores stereoscopic video streams;
    providing a stereoscopic video media information (svmi) box that stores arrangement information about the stereoscopic video streams; and providing a stereoscopic camera and display information (scdi) box that stores information about at least one stereoscopic camera and a recommended display, wherein the trak box refers to at least one of the information stored in the svmi box and the information stored in the scdi box.

21. The method of claim 20, wherein the trak box includes a reference box that stores identification information about the svmi box and the scdi box for referring to at least one of the svmi box and the scdi box.

* * * * *